(12) United States Patent
Bentley

(10) Patent No.: US 7,428,548 B2
(45) Date of Patent: *Sep. 23, 2008

(54) COMPUTER READABLE MEDIUM FOR STORING LARGE DATA FILES

(75) Inventor: Keith Bentley, Elverson, PA (US)

(73) Assignee: Bentley Systems, Inc., Exton, PA (US)

( * ) Notice: Subject to any disclaimer, the term of this patent is extended or adjusted under 35 U.S.C. 154(b) by 511 days.

This patent is subject to a terminal disclaimer.

(21) Appl. No.: 09/929,278

(22) Filed: Aug. 15, 2001

(65) Prior Publication Data

US 2003/0036888 A1   Feb. 20, 2003

(51) Int. Cl.
G06F 7/00 (2006.01)
G06F 12/00 (2006.01)

(52) U.S. Cl. .................... 707/102; 707/1; 707/101; 707/200

(58) Field of Classification Search ......... 707/100–102, 707/1–10, 200–201, 205, 104.1; 715/513; 345/418–420, 538, 556, 700, 764, 779; 703/13, 703/22; 706/919
See application file for complete search history.

(56) References Cited

U.S. PATENT DOCUMENTS

| | | | |
|---|---|---|---|
| 5,008,853 A | 4/1991 | Bly et al. | |
| 5,220,657 A | 6/1993 | Bly et al. | |
| 5,506,983 A * | 4/1996 | Atkinson et al. | ........ 707/1 |
| 5,613,105 A | 3/1997 | Zbikowski et al. | |
| 5,627,936 A | 5/1997 | Prasad et al. | |
| 5,706,504 A | 1/1998 | Atkinson et al. | |
| 5,715,441 A | 2/1998 | Atkinson et al. | |
| 5,765,164 A | 6/1998 | Prasad et al. | |
| 5,778,395 A | 7/1998 | Whiting et al. | |
| 5,812,773 A | 9/1998 | Norin | |
| 5,815,415 A | 9/1998 | Bentley et al. | |
| 5,893,109 A | 4/1999 | DeRose et al. | |
| 5,970,496 A | 10/1999 | Katzenberger | |
| 6,076,105 A * | 6/2000 | Wolff et al. | ........ 709/223 |
| 6,088,694 A | 7/2000 | Burns et al. | |
| 6,128,623 A | 10/2000 | Mattis et al. | |
| 6,134,243 A | 10/2000 | Jones et al. | |

(Continued)

FOREIGN PATENT DOCUMENTS

WO   PCT/US02/25767   12/2002

OTHER PUBLICATIONS

Microsoft Corp., "Storage and Stream Objects" http://msdn.microsoft.com/library/specs/SID203.HTM 2000.

(Continued)

*Primary Examiner*—Miranda Le
(74) *Attorney, Agent, or Firm*—Venable LLP; James R. Burdett; Jeffri A. Kaminski

(57) ABSTRACT

An enhanced file format to store large quantities of variable-sized data records on a storage medium and to permit efficient access and control over data stored in the enhanced file format. A file format is the structure of a file that defines the way it is stored and laid out on a disk. In a preferred embodiment of the present invention, a file format includes a model directory containing models. Models include element lists comprising element chunks. The element chunks include elements, where elements are variable-sized data records.

25 Claims, 12 Drawing Sheets

U.S. PATENT DOCUMENTS

| | | | |
|---|---|---|---|
| 6,134,552 | A | 10/2000 | Fritz et al. |
| RE36,989 | E | 12/2000 | White |
| 6,167,409 | A | 12/2000 | DeRose et al. |
| 6,182,115 | B1 | 1/2001 | Cuomo et al. |
| 6,480,124 | B2* | 11/2002 | Shiba ........................... 341/50 |
| 6,571,203 | B2* | 5/2003 | Fujieda ........................... 703/6 |
| 6,584,480 | B1* | 6/2003 | Ferrel et al. ................. 715/513 |
| 6,604,068 | B1* | 8/2003 | Bukowski et al. ............. 703/22 |
| 6,636,774 | B2* | 10/2003 | Tenma et al. ................... 700/96 |
| 6,654,772 | B1* | 11/2003 | Crow et al. ................. 707/205 |
| 6,671,701 | B1* | 12/2003 | Chouinard ................... 707/201 |
| 6,701,319 | B1* | 3/2004 | Yamane ....................... 707/100 |
| 6,718,329 | B1* | 4/2004 | Selvin et al. ................... 707/10 |
| 6,760,735 | B1* | 7/2004 | Rusche .................... 707/103 R |
| 7,072,061 | B2* | 7/2006 | Blair et al. ................. 358/1.15 |
| 2001/0004245 | A1* | 6/2001 | Shiba ........................... 341/50 |
| 2001/0031066 | A1* | 10/2001 | Meyer et al. |
| 2001/0047251 | A1* | 11/2001 | Kemp ............................. 703/1 |
| 2002/0161608 | A1* | 10/2002 | Loveland ....................... 705/4 |
| 2002/0194209 | A1* | 12/2002 | Bolosky et al. |
| 2002/0194484 | A1* | 12/2002 | Bolosky et al. |
| 2002/0194581 | A1* | 12/2002 | Keener et al. |

OTHER PUBLICATIONS

Microsoft Corp., "A File System Within a File" http://msdn.microsoft.com/library/specs/SID202.HTM 2000.

Microsoft Corp., "Storages and Streams" http://msdn.microsoft.com/library/psdk/com/stgasstg__227n.HTM Dec. 5, 2000.

Microsoft Corp., "Compound Files" http://msdn.microsoft.com/library/psdk/com/stgasstg__8do3.HTM Dec. 5, 2000.

Microsoft Corp., "Structured Storage Interfaces" http://msdn.microsoft.com/library/psdk/com/stgasstg__7elv.HTM Dec. 5, 2000.

Microsoft Corp., "Direct Access vs. Transacted Access" http://msdn.microsoft.com/library/specs/SID206.HTM 2000.

Microsoft Corp., "The Evolution of File Systems" http://msdn.microsoft.com/library/psdk/com/stgasstg__1zn7.HTM Dec. 5, 2000.

Microsoft Corp., "Application Design with Structured Storage" http://msdn.microsoft.com/library/specs/SID204.HTM 2000.

Supplemental European Search Report Appln No. 02757100.9-2415 dated Feb. 9, 2007.

* cited by examiner

COMPUTER READABLE MEDIUM FOR STORING LARGE DATA FILES

BACKGROUND OF THE INVENTION

1. Field of the Invention

The present invention relates to a system and method for storing large data files on a computer or computer network. More specifically, the present invention is related to the formatting of large data files to promote efficient data storage and transmission.

2. Statement of the Prior Art

Data is typically maintained for storage and retrieval in computer file systems, wherein a file comprises a collection of data or a set of records. A file system provides a collection of files and file management structures on a physical or logical storage device such as a disk or other memory device. A file system stores data in files, and provides an application programming interface (API) to facilitate accessing data stored on a storage medium such as a disk or other memory medium. A file system API provides various functions that are invoked by an application program to access data. Application programs control the internal format of a file and determine which data to store in which files. A file system typically allows files to be grouped into directories. Each directory may contain many files and sub-directories. A file system that groups files into directories and sub-directories is referred to as a hierarchical file system.

There is a continuing need to improve the access and control over file systems storing large quantities of variable-sized data records used in a large variety of applications. Applications involving accessing and controlling large quantities of stored data are found in the public sector, E-commerce, financial/insurance industry, travel industry, publishing industry, graphic arts industry, advertising industry and any other industry which requires managing large data files.

Examples where large amounts of data are stored in files in a hierarchical file system include database, logistics, and enterprise solutions software used by the financial, health and distribution industries, among others. Database, logistics and enterprise solutions software include an API to access large quantities of data.

In another example, computer-aided design (CAD) drawings prepared by architects, engineers, designers, planners, and the like require large amounts of data to be stored in files in a hierarchical file system. CAD software includes an API to access the large quantities of data. Applications such as, e.g., MicroStation® products, which are developed by Bentley Systems, Inc., Exton, Pa. U.S.A., and AutoCAD® products, which are developed by Autodesk, Inc., San Rafael, Calif., U.S.A. are typical of such CAD software, which may be used in the Engineering, Construction, and Operations (ECO) marketplace. U.S. Pat. No. 6,063,128 provides an example of a CAD system.

A typical CAD project employed in the engineering context is stored in numerous files. Each file typically contains one or more engineering models, each of which represents an engineering domain (e.g., structural, electrical, mechanical, plumbing). Moreover, each engineering model requires numerous items represented by a series of elements to support the complex and precise nature of each design. In this context, the term "element" is used to mean a record containing a variable number of bytes of data arranged in a format that can be interpreted by a program. The term "element" differs from the common notion of an "object" in that each element can have a variable number of bytes, whereas the size of an object is typically defined by its class. It is the variable-sized nature of elements that causes their persistent storage to be complicated, because they cannot be written in fixed sized records and arranged in tables, as is typically done in relational databases, for example.

At least one element or an aggregation of elements represents each item in a model. For example, a structural drawing can hold the column and beam layout for a floor plan, which are internally represented by lines, squares and rectangles and additional properties. In this example, an individual beam may be a collection of lines, squares and rectangle elements. The structure of the floor plan may be more complex and require many nested levels of elements to accurately provide a structural representation.

Accordingly, as the complexity of the project increases, the size of the CAD files also increases. As a result, CAD files become very large and efficient access and control of these large files is important. Conventionally, there are two approaches to storing these large data files.

In the first approach, the elements are stored and accessed as a sequential list, each element having a fixed header containing the element's size. Storing data in this manner requires that the file be read sequentially from the beginning to the end. Typically, a program will read the elements from the file into memory and, at the same time, also store the "file position" of each element in memory.

This approach is well suited for the common scenario where a large number of elements are read from the disk, while only a small minority of them are modified during a single editing session. In this case, modified elements can often be rewritten to the file by a simple seek-and-write to the appropriate file position on an element-by-element basis. Unfortunately, this only works for elements whose contents change, but whose size in bytes remains the same or becomes smaller. When elements become larger during an editing session, they must be deleted from their original file position and moved to the end of the file. This tends to leave "holes" (deleted elements occupying file space) in the file that can only be removed by rewriting the entire file. Further, the size of disk file can grow quite large, because it is not possible to remove deleted entries from the file without rewriting the entire file, and invalidating all in-memory element positions.

The second approach is to apply a compression algorithm to the element data before it is written to the file. This can often result in substantial savings in the resultant file size, because many applications have element data typically containing a great deal of redundancy. However, with this approach, element data cannot be saved incrementally, because a change to a single element can result in an entirely different compressed file.

Another consideration for the file storage approach is the typical requirement to allow multiple users to simultaneously access models when collaborating on a project. Typically, a first user creates an original model, which multiple users may view and/or edit depending on the level of access granted to the user. Since communication between users typically occurs over a computer network, the CAD system must ensure that changes to the model or items in the model are properly coordinated and the models are kept in a consistent state at all times. It is understood that a computer network refers to any type of computer network including but not limited to a local area network, wide area network (e.g. Intranet), and the Internet. The Internet includes but is not limited to the World Wide Web.

Since computer systems used in many industries (such as ECO) demand efficient use of network resources and have the further requirement that the file system must perform in a multi-user environment, existing file storage approaches require substantial improvement in order to enhance the efficiency of the file system to support the increasing data storage requirements. Therefore, there is a continuing need for an enhanced file storage approach, which efficiently accesses and controls large quantities of data in a single user and multi-user environment. Moreover, there is a continuing need for an enhanced file format permitting access and control to large quantities of data to improve the efficient transfer and storage of large quantities of data.

SUMMARY OF THE INVENTION

In preferred embodiments of the present invention, such problems are avoided by use of a computer readable medium containing a file for storing a root storage including a model directory comprising at least one model. At least one model comprises a model header and at least one element list including at least one element chunk. The at least one element chunk further comprises an element chunk header and at least one element associated with the element chunk header.

A computer program product in accordance with a first embodiment of the present invention comprises a computer readable medium having a computer program logic stored therein. Such computer program logic generally comprises means for enabling a computing unit to store a root storage comprising a model directory in a storage area, and means for enabling said computing unit to store at least one model in the model directory. The at least one model further comprises a control element list having element chunks containing control elements, and a graphic element list having element chunks containing graphic elements.

According to a second embodiment of the present invention, the computer program product comprises a computer readable medium having a computer program logic stored therein. In turn, the computer program logic comprises means for enabling a computing unit to store a root storage comprising a model directory in the computer readable medium, and means for enabling said computing unit to store in the computer readable medium at least one model in said model directory. The at least one model further comprises a control element list having element chunks containing control elements, and a graphic element list having element chunks containing graphic elements.

A computer program product in accordance with a third embodiment of the present invention comprises a computer readable medium having computer program logic. Such computer program logic further comprises: (a) means for enabling a computer system to store at least one root storage in a storage area; (b) means for enabling the computer system to store at least one model directory in the at least one root storage; (c) means for enabling the computer system to store at least one model in the model directory; (d) means for enabling the computer system to store in the at least one model a graphic element list having element chunks containing graphic elements and a control element list having element chunks containing control elements; (e) means for enabling the computer system to assign a preselected number of elements to each element chunk; and (f) means for enabling the computer system to allocate each of the preselected number of elements to an element chunk in one of the control element list and the graphic element list.

According to a fourth embodiment of the present invention, a computer readable medium contains a file for storing an element list including at least one element chunk. The at least one element chunk further comprises an element chunk header and at least one element associated with the element chunk header.

A computer program product in accordance with a fifth embodiment of the present invention generally comprises a computer readable medium having a computer program logic stored therein. Such computer program logic, in turn, comprises means for enabling a computing unit to store an element list in a storage area, and means for enabling a computing unit to store at least one element chunk comprising an element chunk header and at least one element associated with the element chunk header in the element list.

According to a sixth embodiment of the present invention, a computer program product comprises a computer readable medium having a computer program logic stored therein. Such computer program logic, in turn, comprises means for enabling a computing unit to store an element list in the computer readable medium, and means for enabling the computing unit to store at least one element chunk comprising an element chunk header and at least one element associated with the element chunk header in the element list.

Other objects, advantages, and novel features of the present invention will become readily apparent from the following detailed description thereof, when considered in conjunction with the accompanying drawings wherein:

DETAILED DESCRIPTION OF THE PREFERRED EMBODIMENTS

The present invention relates to providing an enhanced file format to store large quantities of variable-sized data records on a storage medium and to permit efficient access and control over data stored in the enhanced file format. A file format is the structure of a file that defines the way it is stored and laid out on a disk. In a preferred embodiment of the present invention, a file format includes a model directory containing models. Models include element lists comprising element chunks. The element chunks include elements, where elements are variable-sized data records.

Figure 1:
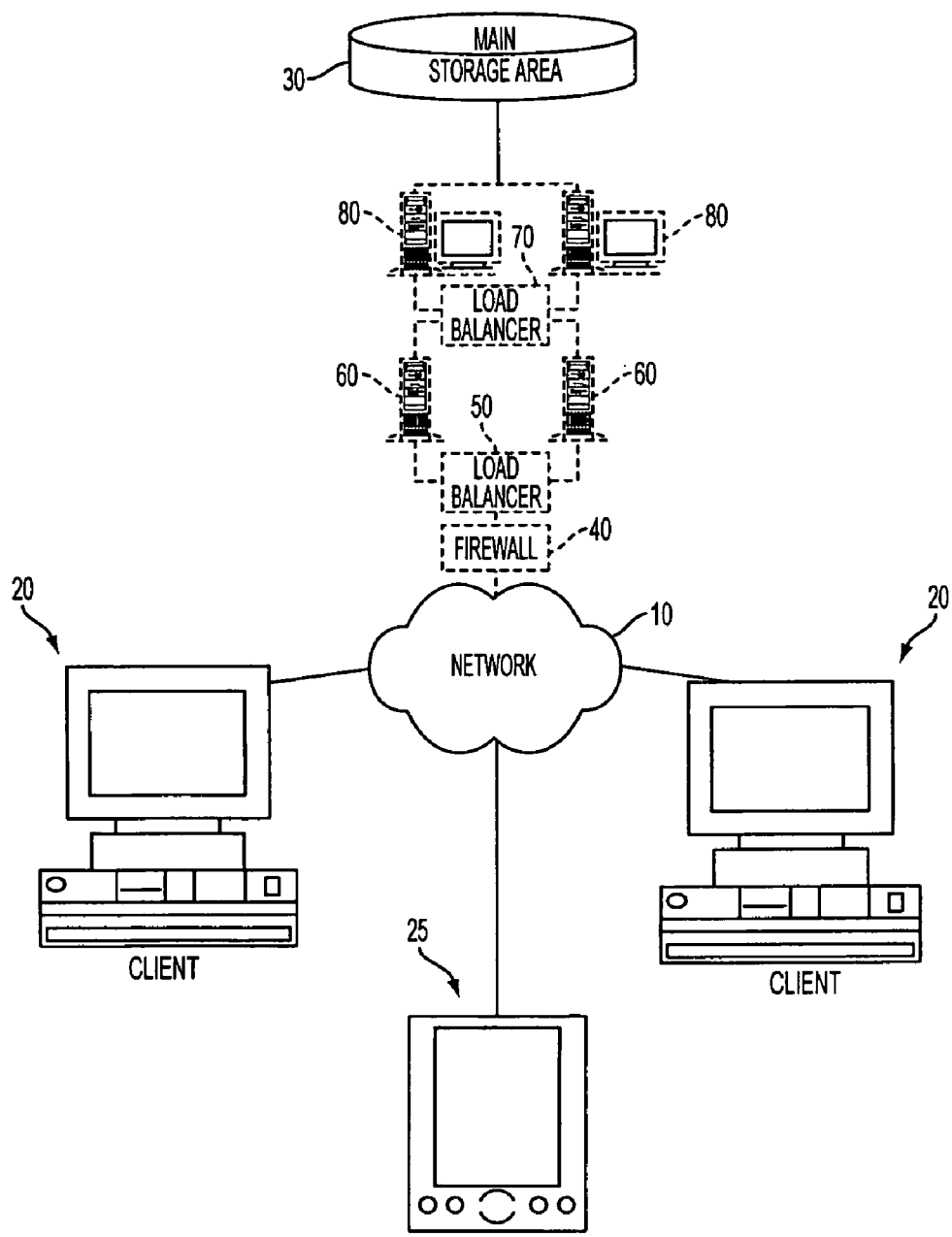
FIG. 1 shows a block diagram illustrating a high-level exemplary network environment for handling large data files.

Referring now to the drawings, wherein like reference characters and numerals designate like or corresponding parts throughout each of the several views, there is shown in FIG. 1 a diagram illustrating a high-level exemplary network environment for handling large data files in accordance with the file system and file format of the present invention. The file format of the present invention is intended to be utilized in any network environment such as the Internet, Intranet, local area network, etc. for any application, but may also be utilized on stand-alone computer workstations and/or processing units. By use of the term "Internet," it should be understood that the foregoing is not intended to limit the present invention to a network also known as the World Wide Web.

The network 10 is a computer system adapted to be accessed by a plurality of clients. Such clients, in turn, suitably comprise one or more conventional workstations 20, wireless computing devices 25, or other end user devices operating as a "fat" or a "thin" client. It should be understood, nevertheless, that wireless computing devices 25 include computing devices such as Web-enabled hand-held devices such as, e.g., a Palm V™ type devices manufactured by Palm, Inc., Santa Clara, Calif. U.S.A., Windows CE devices, pagers, and "smart" phones, which can use a wireless access protocol; Internet appliances; and other computing and end user devices which operate via satellite, infrared, remote sensor or other means not requiring a physical connection or coupling to another computing device, appliance or network, also fall within the spirit and scope of the present invention.

Clients of all of the above types can suitably access the network 10 and the main storage area 30 through the network 10. The network 10 may be directly coupled to the main storage area 30 or the network 10 may access the main storage area 30 through firewall 40, load balancer 50, network servers 60, load balancer 70 and application servers 80. The load balancer 50 and load balancer 70 may be the same type of unit. These load balancers 50 and 70 route traffic to and from the main storage area 30. It is understood that the present invention is not limited to this arrangement. However, the network must access a main storage area 30, which is either internal to the network 10 or external to the network 10. The main storage area 30 is a computer readable medium.

Figure 2:
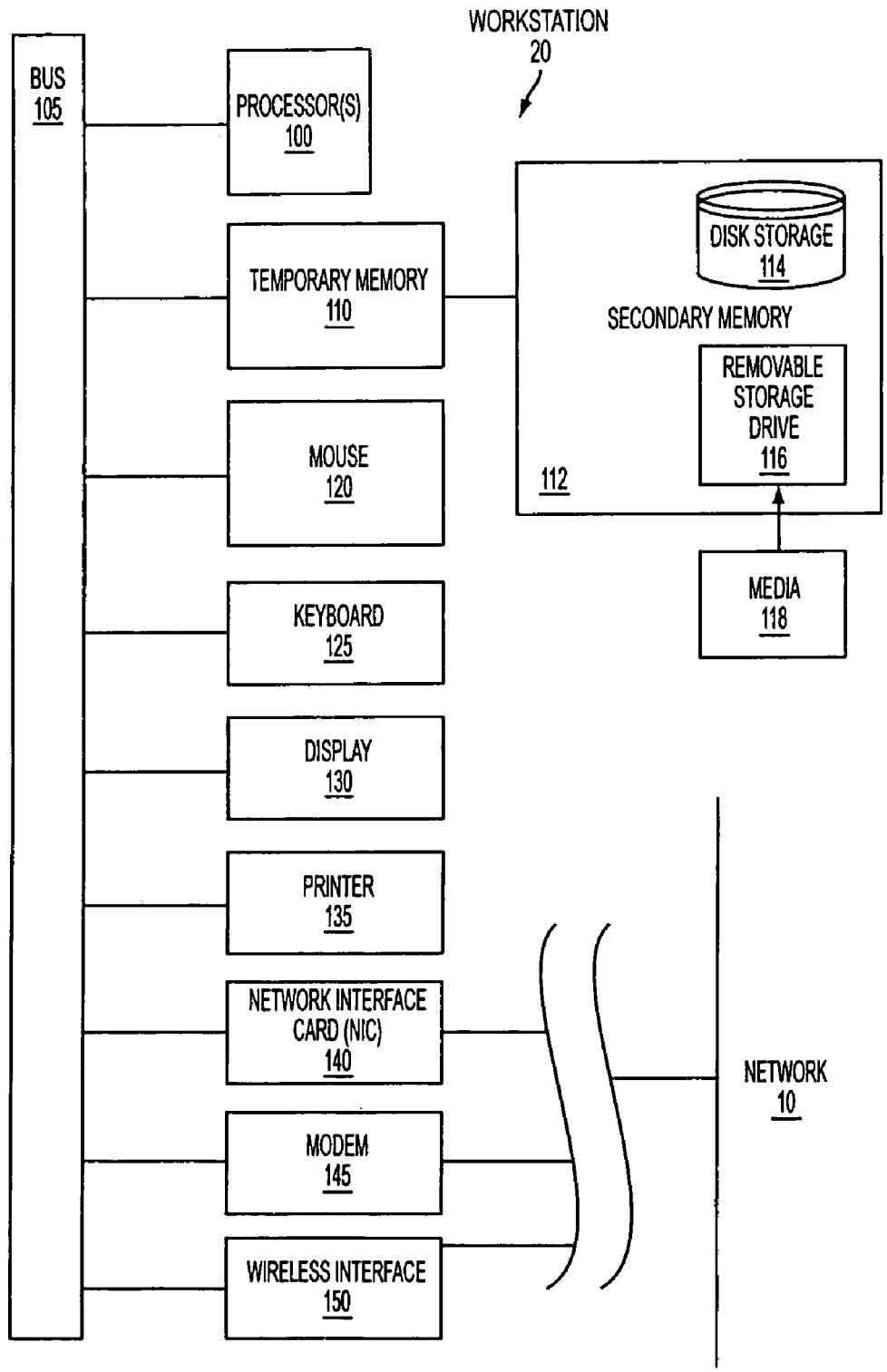
FIG. 2 shows a high level exemplary workstation adapted to transfer, receive and/or store large data files.

FIG. 2 shows a block diagram of a workstation 20 coupled to the network 10. Workstation 20 includes one or more processors 100 coupled to a bus 105. The bus 105 can be coupled to any of various subsystems including: a temporary memory 110; a secondary memory 112 such as, a disk 114, and/or a removable storage drive 116 into which media 118 can be placed including, e.g., a diskette, a compact diskette (e.g. CD ROM) or the like; an input device such as a mouse 120, or a keyboard 125; an output device such as a display 130 or printer 135; and input/output (I/O) devices to a network 10 such as network interface card (NIC) 140 such as an Ethernet, Token Ring, Smart and Asynchronous Transfer Mode (ATM) cards. Other input/output devices may include a modem 145, or other input/output device such as, a wireless interface 150 (e.g. a wireless transceiver). It will be apparent to those skilled in the relevant art that the above-described workstation 20 has been provided as an example and is not intended to limit the breadth of the invention in any way. In addition, it is understood that the wireless computing device 25 includes several of these components and/or is adapted to interface with a workstation 20 having these and/or similarly functioning components. For the purposes of the specification and claims, it is understood that the wireless computing device 25 is functioning as a workstation 20. Therefore, it is understood that any further reference to a workstation in the specification, drawings or claims includes both wired and wireless computing devices.

Figure 3:
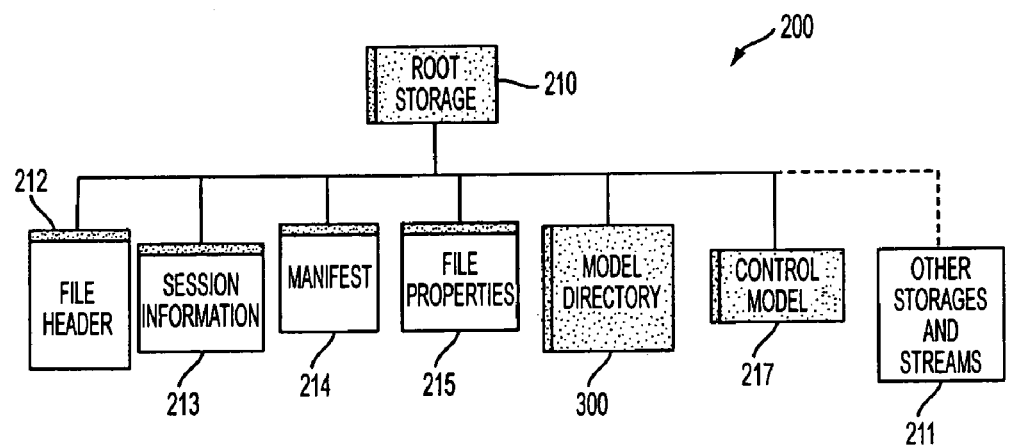
FIGS. 3-7 show the file format of the present invention.

FIG. 3 shows a file format (internal structure) 200 of a file of the present invention, which is preferably stored in the main storage area 30 and may be stored in temporary memory 110 in one or more workstations 20. One or more files having the file format 200 are stored in the main storage area 30 and more than one file may be stored in temporary memory in the workstation 20.

Within files created using the file format of the present invention, information is organized hierarchically; utilizing a "Storage and Stream" approach. A "Stream" is a variable-sized sequence of bytes that is assigned an identifier, such as a name, and can be saved persistently. In this respect, a Stream can be analogous to a "file" in a disk file system. A "Storage" can be analogous to a file system "directory"; it has an identifier such as a name, and can contain Streams or other Storages.

In the present invention, the starting point for reading or creating files is the root storage 210. The root storage 210 contains other storages and streams including, but not limited to, those defined by the current invention. It should be obvious that since the root storage 210 is created using well known programming interfaces, other applications can create other storages and streams 211 within a file created by the present invention without corrupting the other items in the file. However, programs creating or reading files having the file format of the present invention may store one or more streams of a known format such as the following:

File Header stream 212 to hold information about the file itself, such as whether the file is compressed or encrypted, and if so, what techniques are employed in the compression and/or encryption;

Session Information stream 213 to hold information about the current editing session, such as the name of the current user editing the file;

Manifest stream 214 to hold identification information about the file, such as a globally unique number assigned by an authentication source, and a Universal Resource Locator to find the authentication source;

File Properties stream 215 to hold information about the file that are exposed to other applications using well-known interfaces such as Microsoft's IPropertySet interfaces.

Figure 4:
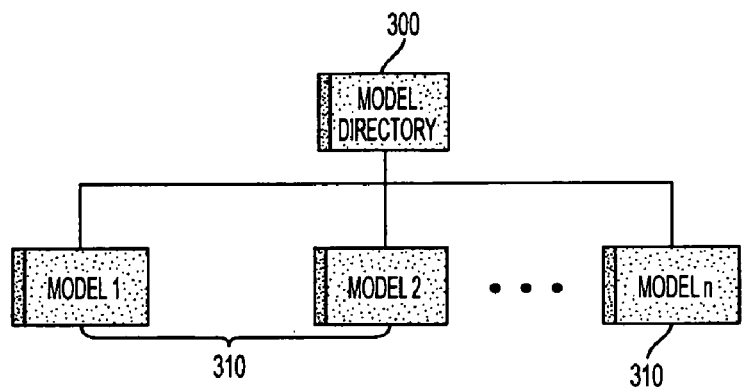

An important purpose of the present invention is to provide a system and method to store large sets of variable-sized elements. For convenience, related elements are grouped together in a model 310. Models 310 may group elements for any purpose relevant to an application, but are frequently intended to reflect some real world structure. It is often desirable to store multiple models 310 in the same file. To accomplish this, a storage of the root storage 210 called the model directory 300 is created. The model directory 300 holds a list of models 310, each with a unique name (FIG. 4). Alternatively, if only a single model per file is desired, the model 310 can be stored directly in the root storage 210 without creating a model directory 300.

In many cases, it may be necessary to designate one model 310 as having special significance versus all other models in a file. For example, certain elements may contain resources that are shared among all models in the file. In this case a specially named model is stored directly in the root storage 210, called the control model 217. The control model 217 is in the same format as all other models 310 other than its special name and location in the root storage 210. When referring to the control model, the term "global" may be placed before the terms graphic element list 311, control element list 312, element chunk 320, graphic element, control element, etc. to indicate that the item refers to a resource which is shared among all of the models. In an alternate embodiment according to the present invention, control model 217 includes only one element stream, having neither a graphic element stream nor a control element stream.

The number of models 310, which may be stored in a model directory 300, is only constrained by the amount of memory in the main storage area 30. Therefore, if there was an infinite amount of memory in the main storage area 30, then there could be an infinite number of models 310 in the model directory 300.

Figure 5:
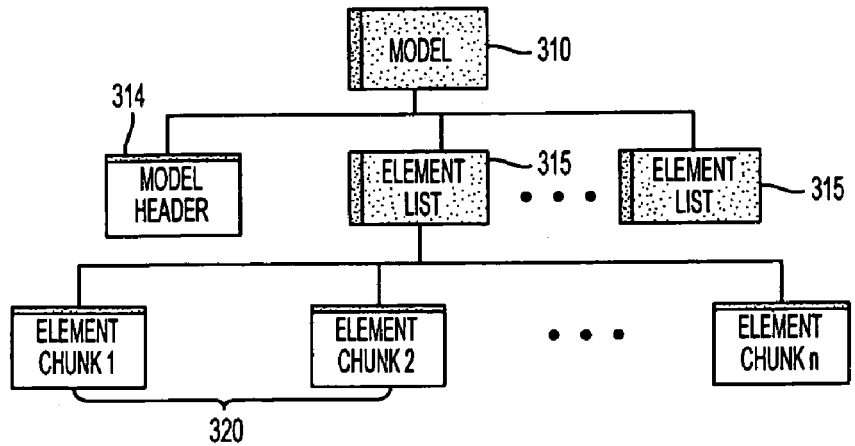

As shown in FIG. 5, every model 310 contains a specially named stream called a model header stream 314 to hold information that is specific to the model 310. For example, the model header stream 314 can contain the model name, the units (e.g. metric/English), the geometric range of the model 310, etc., or any other information that may be relevant to know about the model 310 without actually having to load the model into a memory.

Figure 6:
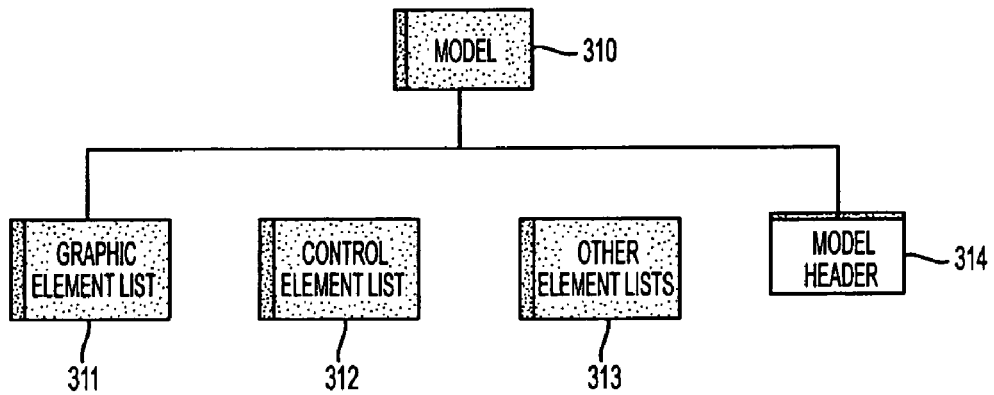
Figure 7:
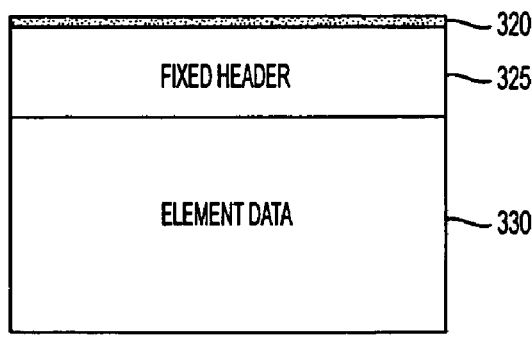

Within a specific model 310, elements can be further classified according to their meaning in the model. Each such category of elements is stored in a sub-storage of the model 310 called an element list storage 315. For example, in CAD applications, elements are often classified into two types: graphic and control. Graphic elements have a physical representation that occupies geometric space and can be drawn on a computer screen or a plotter. Control elements hold information pertinent to the model, but that does not, on its own, have a physical representation. As shown in FIG. 6, the graphic elements can be stored in a graphic element list 311 and the control elements can be stored in the control element list 312. Further categories of elements can be stored in additional element lists 313.

Within an element list storage 315 (e.g., graphic element list 311 and control element list 312), individual elements are stored in groupings, or "element chunks" 320 as shown in FIG. 5. Each element chunk 320 is given a unique name preferably derived from its chunk number (e.g. "chunk001", "chunk002", etc.) so that the number of such chunks can be determined merely by iterating over the names in the element list storage 315. Alternatively, an element list header stream could be created to hold the stream names of the element chunks, but that would require the element header to be updated as element chunks are added and removed.

One purpose for dividing the elements stored in an element list storage 315 among a series of element chunks 320, is to permit compression and encryption of the element chunks 320 without requiring that the entire element list 315 held in the model be rewritten when any individual element is modified. This can be particularly important in certain types of applications, such as CAD applications, where the element data tends to be large but sparse. In this case, many well-known compression algorithms can yield significant ratios of the original size of the data to the compressed size of the data. Compressing element data can be a significant factor in the performance of the applications in terms of disk space, file I/O requirements, and network transfer times. Similarly, encryption algorithms are designed to accept original data and create encrypted data. However, in many applications such as CAD applications, small subsets of elements can be modified frequently and must be written to the disk often, both for reliability concerns and for real-time sharing of element data with other users on a network. In this case it would be impractical and unacceptable to have to recompress, re-encrypt, and rewrite an entire element list 315 every time any element changes.

Several approaches can be used to determine how to subdivide an element list 315 into a series of element chunks 320. One approach is to fill element chunks 320 with elements until the chunk size reaches a pre-determined limit. This will tend to make the pre-compressed size of each element chunk 320 approximately the same. In the preferred embodiment of the present invention, the size of an element chunk 320 is determined by choosing a fixed number of elements. This approach makes the maintenance of element chunks 320 straightforward. However, certain applications may require that certain groups of elements be considered "atomic," and be stored and retrieved as a single unit. In this case, the entire group should preferably be stored in a single element chunk 320. For example, in a CAD application where the size of an element varies but tends to approximate 100-200 bytes, a chunk size of 1000 elements has been demonstrated to work well. As should be obvious, the number of elements in any given element chunk 320 within an element list 315 need not be the same as all other element chunks 320 in the same element list 315. This can often be the case, either due to application grouping of elements that must all reside in the same element chunk 320, or due to element deletions after their original insertion into an element chunk 320.

Each element chunk 320 preferably has a fixed header 325 (element chunk header) that can contain information necessary to read the elements from the chunk 320 into memory. For example, the fixed header 325 should contain the number of elements in the element chunk 320, so that value can be known before reading the element data 330 from the element chunk 320. The fixed header 325 can also contain additional information, such as the compression and encryption scheme used for the element data 330 in the case where it is desirable to allow such compression and encryption scheme to vary from element chunk 320 to element chunk 320 within an element list 315.

In each element chunk 320 immediately following the fixed header 325 at the offset equal to the size of the fixed header 325, is the element data 330. Depending on the values of the compression and encryption flags in the fixed header, the element data 330 can be either in "raw" (uncompressed and unencrypted) form or in compressed and/or encrypted form.

Figure 8A:
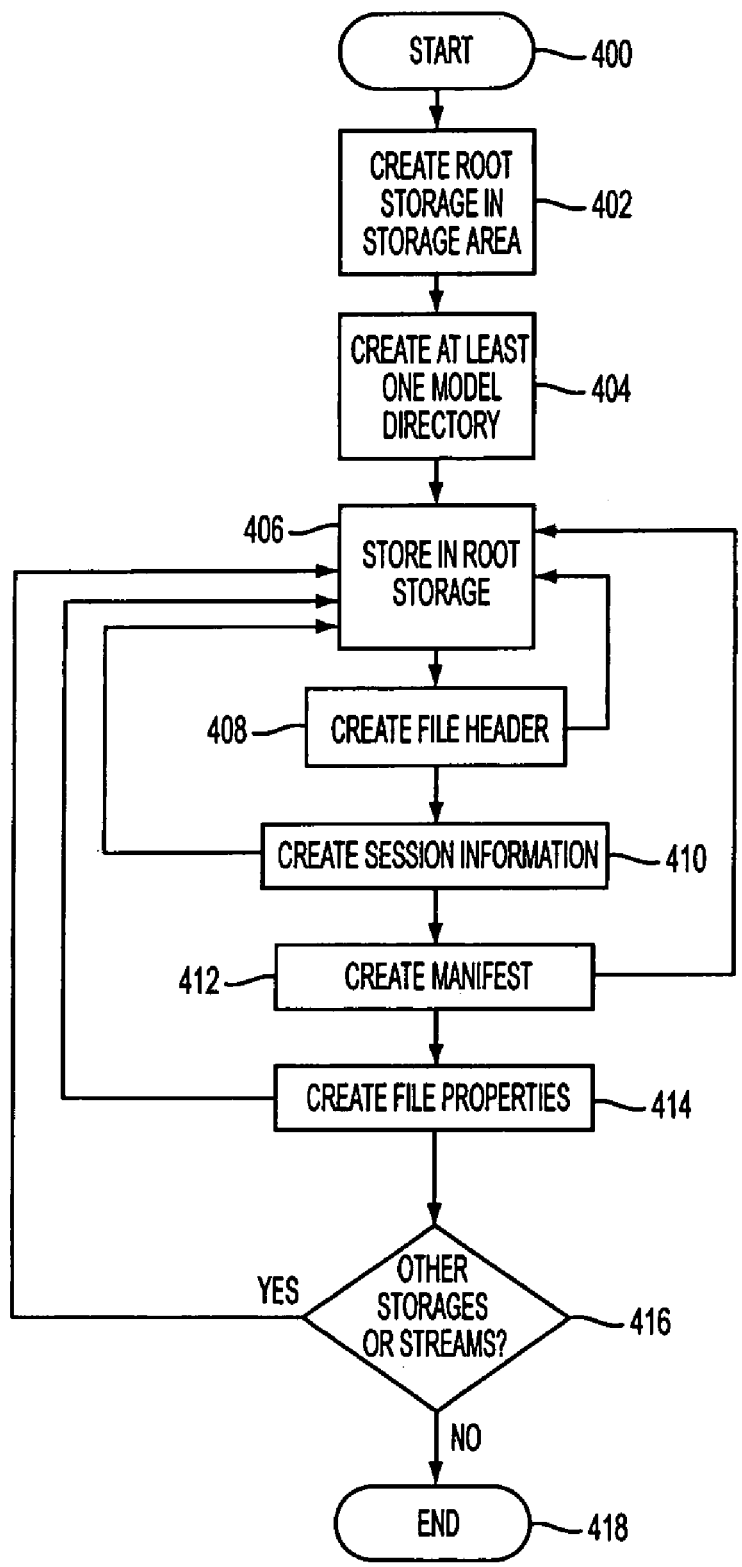
FIGS. 8A-8B show the creation and storage of element chunks in accordance with two embodiments of the present invention.

FIG. 8A shows the creation and storage of element chunks in accordance with the present invention. The process of creating a file according to the file format of the present invention begins (400) by creating a root storage 210 (402). At least one model directory 300, having at least one model 310 is created (404), and stored in the root storage 210 (406). A file header 212, session information 213, manifest 214, file properties 215 are preferably created and stored in the root storage 210 as shown in steps 406-414 of FIG. 8A. These items can be created and stored in any order in the root storage 210. In addition as discussed above, other applications can create other storages and streams 211 within a file created by the present invention without corrupting the other items in the file and these storages and stream 211 are also stored in the root storage 210, which is shown in steps 416 and 406 in FIG. 8A.

Figure 8B:
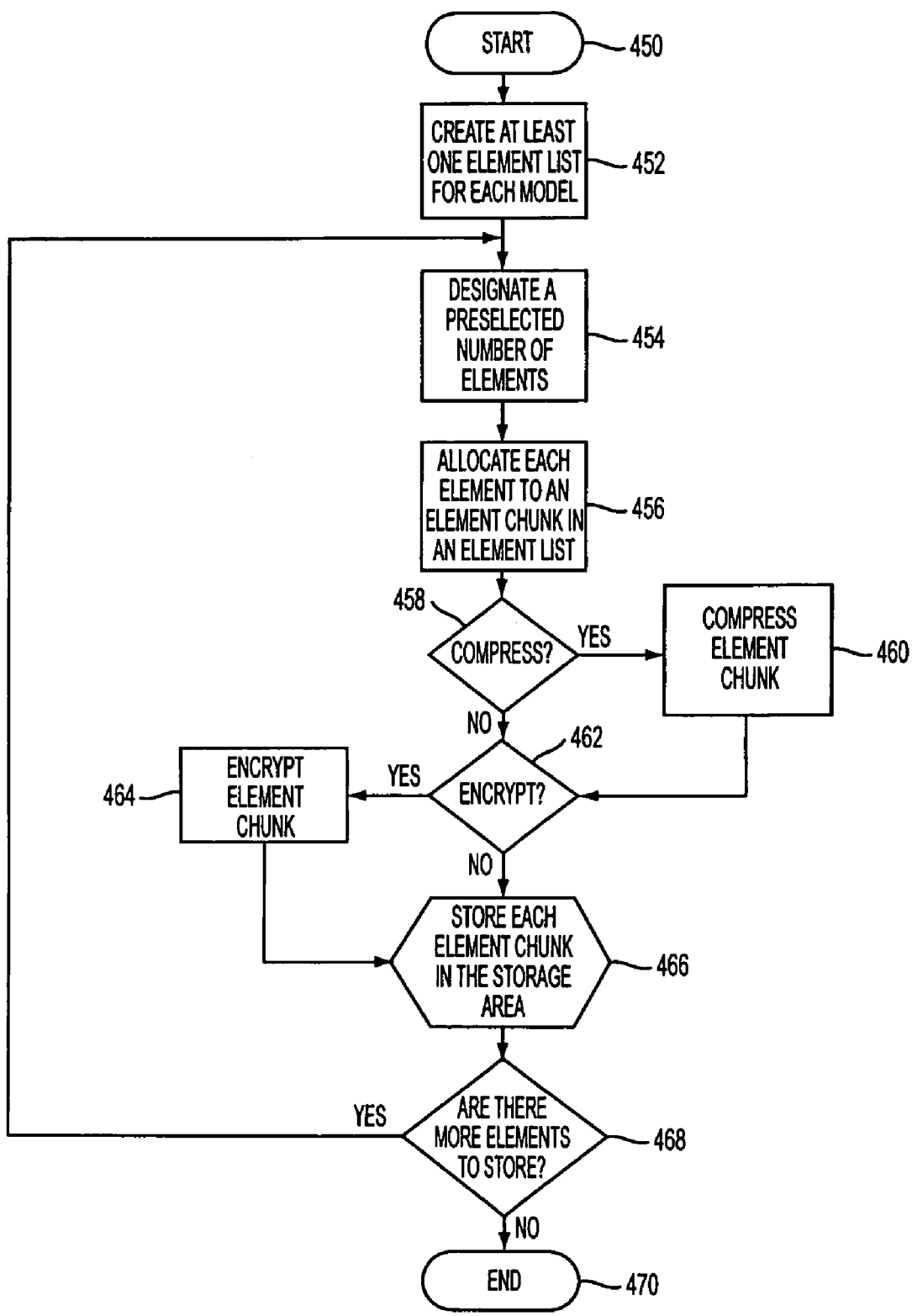

As shown in FIG. 8B, each model 310 preferably contains at least one element list (452). (However, each model 310 is not required to contain an element list 315.) For example, each model 310 may contain a graphic element list 311 and a control element list 312. Each element chunk 320 contains a predetermined or preselected number of elements, wherein the actual number of elements in each element chunk 320 does not have to be the same as discussed previously (454). The preselected number can be a maximum number of elements. As each element, associated with a file format 200, is created, each element is allocated to an element chunk 320 in an element list 315 (456). Subsequently, the element chunk 320 is preferably compressed (458, 460). However, compression is not necessary (458). Each compressed element chunk 320 may also be encrypted (462, 464). However, encryption is not necessary (462). Subsequently, the element chunk 320 is stored in the storage area (466). The element chunk 320 stored in the storage area may or may not be encrypted, compressed or both encrypted and compressed (466). If additional elements require storage (468), then steps 450-468 are repeated until all of the elements are allocated to element chunks 320 and the element chunks 320 are stored in the storage area.

Figure 9A:
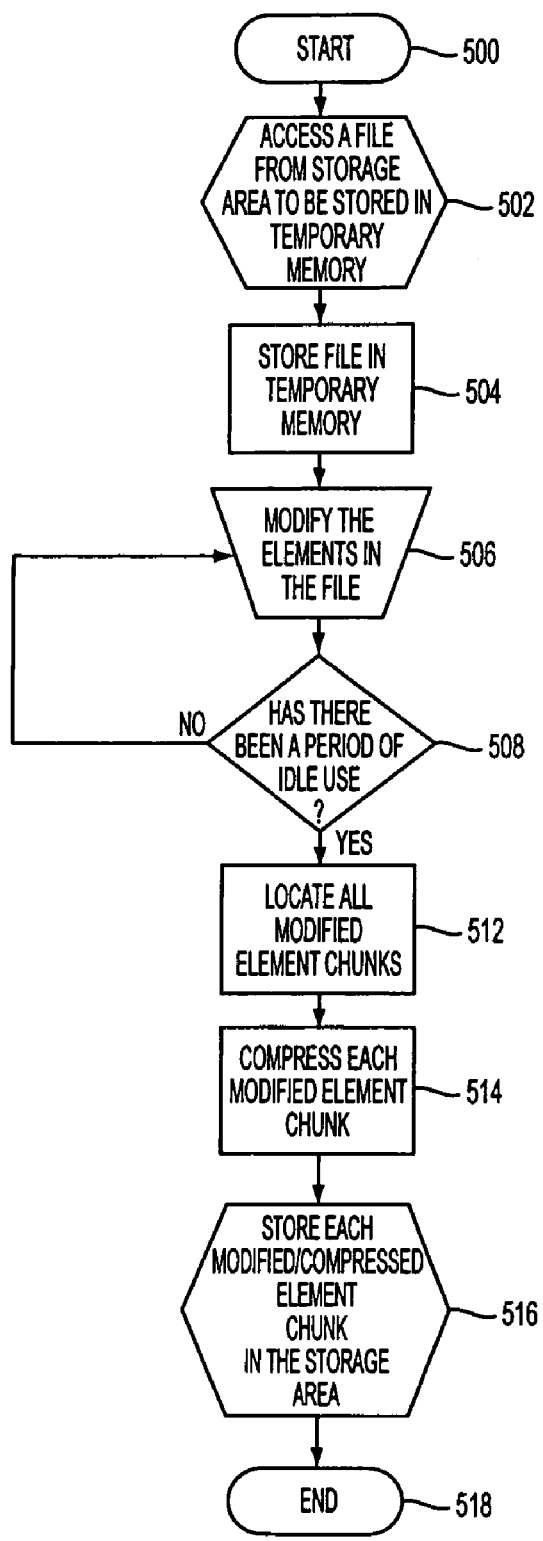
FIGS. 9A-9B show block diagrams for automatically storing element chunks having modified elements in accordance with other embodiments of the present invention.

FIG. 9A shows a block diagram for automatically storing element chunks 320 having modified elements in accordance with another embodiment of the present invention (steps 500-518). The process begins (500) by accessing a file having a file format 200 of the present invention in a storage area such as main storage area 30, and storing the file in temporary memory (503, 504). The temporary memory is preferably located in a workstation 20. A user, who is granted permission to edit the contents of the file in temporary memory, modifies the elements in the temporary memory (506). Each time a user modifies an element, a "dirty" flag is set to indicate the element chunk 320, containing the element that has been modified. If there is a period of idle use during which time the user has not made additional changes to the elements (508), the computer network 10 determines whether any dirty flags have been set. If a modification has been made, the computer network 10 identifies all of the element chunks 320 containing modified elements (512). The modified element chunks 320 containing the modified elements are compressed (514) and stored in the main storage area 30 by overwriting the unmodified element chunk 320 in the storage area 30 (516-518).

Figure 9B:
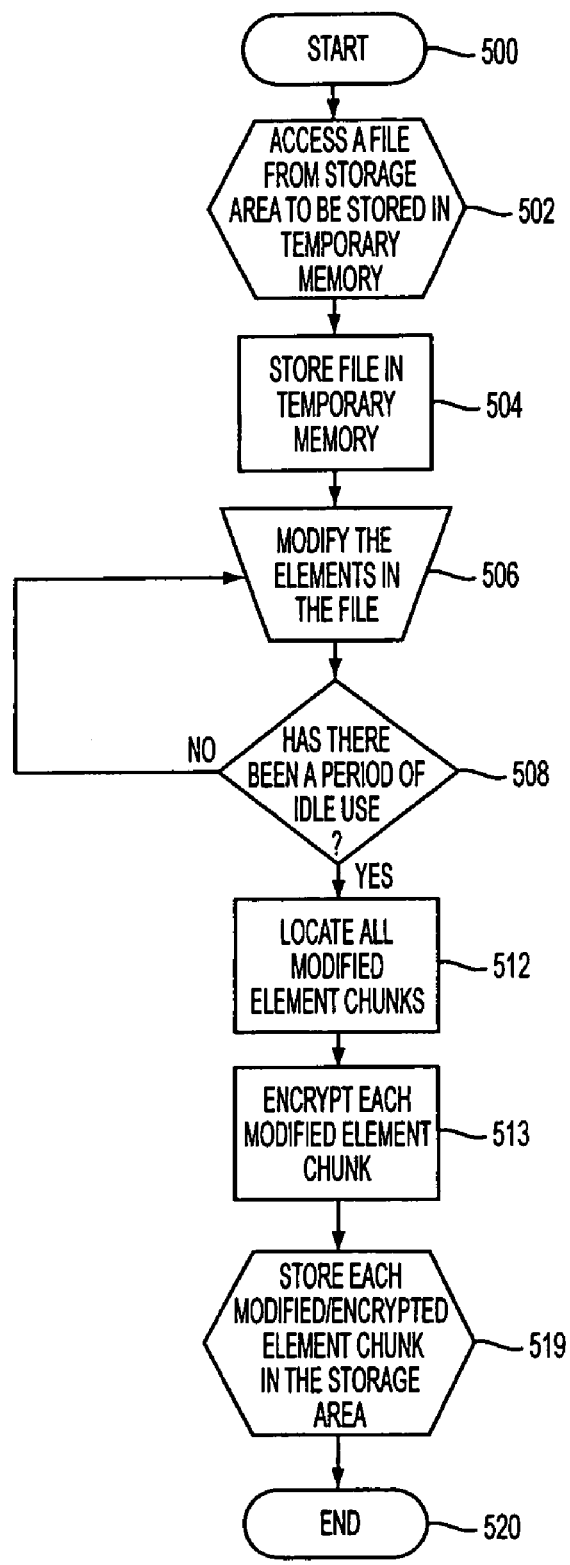

Alternatively, FIG. 9B shows a block diagram for automatically storing element chunks 320 having modified elements in accordance with another embodiment of the present invention (steps 500-520). The process begins (500) by accessing a file having a file format 200 of the present invention in a storage area such as main storage area 30, and storing the file in temporary memory (503, 504). The temporary memory is preferably located in a workstation 20. A user, who is granted permission to edit the contents of the file in temporary memory, modifies the elements in the temporary memory (506). Each time a user modifies an element, a "dirty" flag is set to indicate the element chunk 320, containing the element that has been modified. If there is a period of idle use during which time the user has not made additional changes to the elements (508), the computer network 10 determines whether any dirty flags have been set. If a modification has been made, the computer network 10 identifies all of the element chunks 320 containing modified elements (512). The modified element chunks 320 containing the modified elements are encrypted (513), and stored in the main storage area 30 by overwriting the unmodified element chunk 320 in the storage area 30 (519-520).

Figure 10:
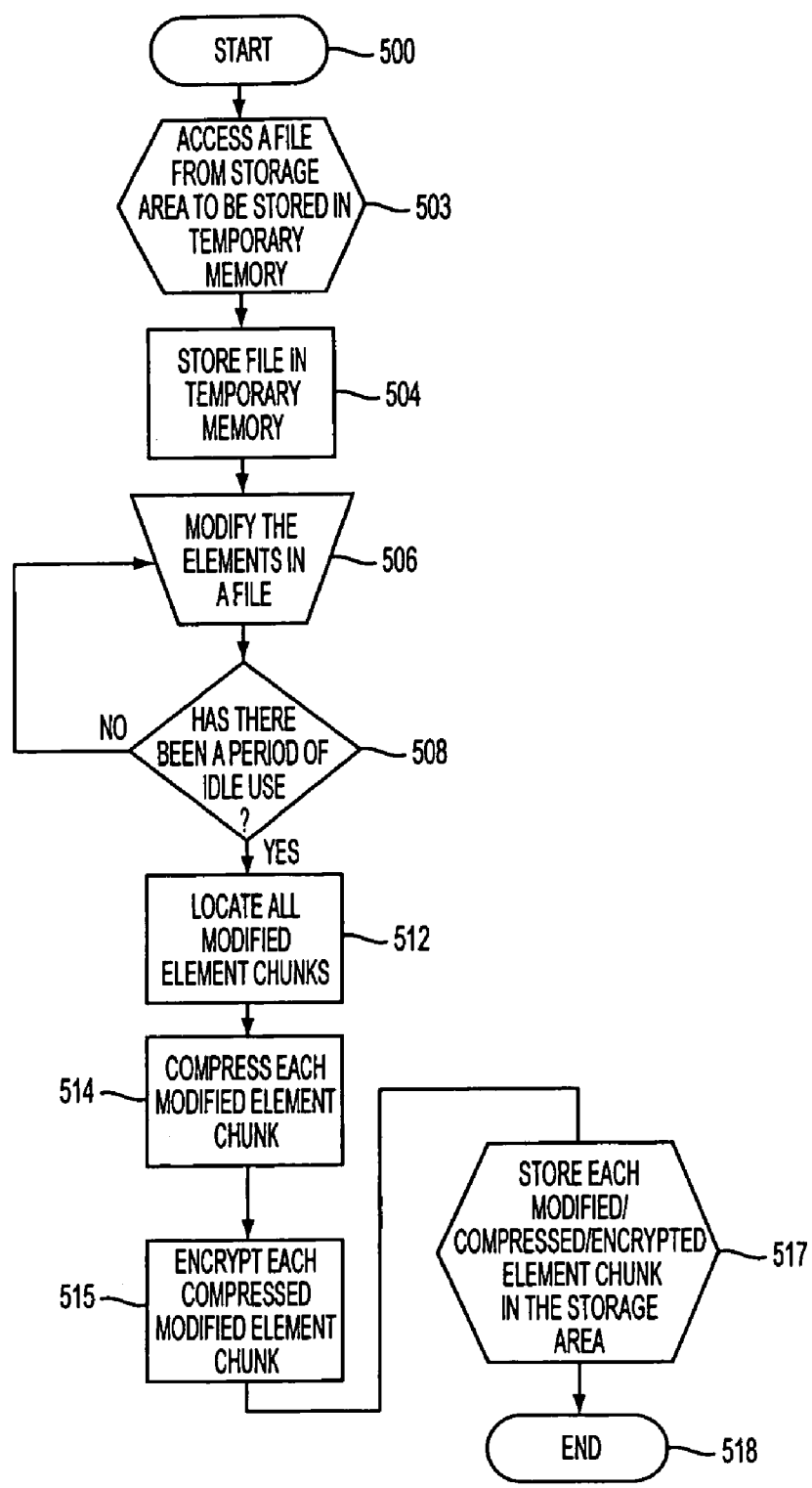
FIG. 10 shows a block diagram for automatically storing element chunks having modified elements in accordance with another embodiment of the present invention.

Alternatively, FIG. 10 shows a block diagram for storing element chunks 320 having modified elements in accordance with another embodiment of the present invention (steps 500-518). In this embodiment, the element data 330 are encrypted and compressed in the main storage area 30. Therefore, in order to access a file from the main storage area 30 and store the file in the temporary memory, the element data 330 must be decrypted and decompressed (503). The compression operation preferably precedes the encryption operation. However, these operations may be reversed (514-515).

Figure 11A:
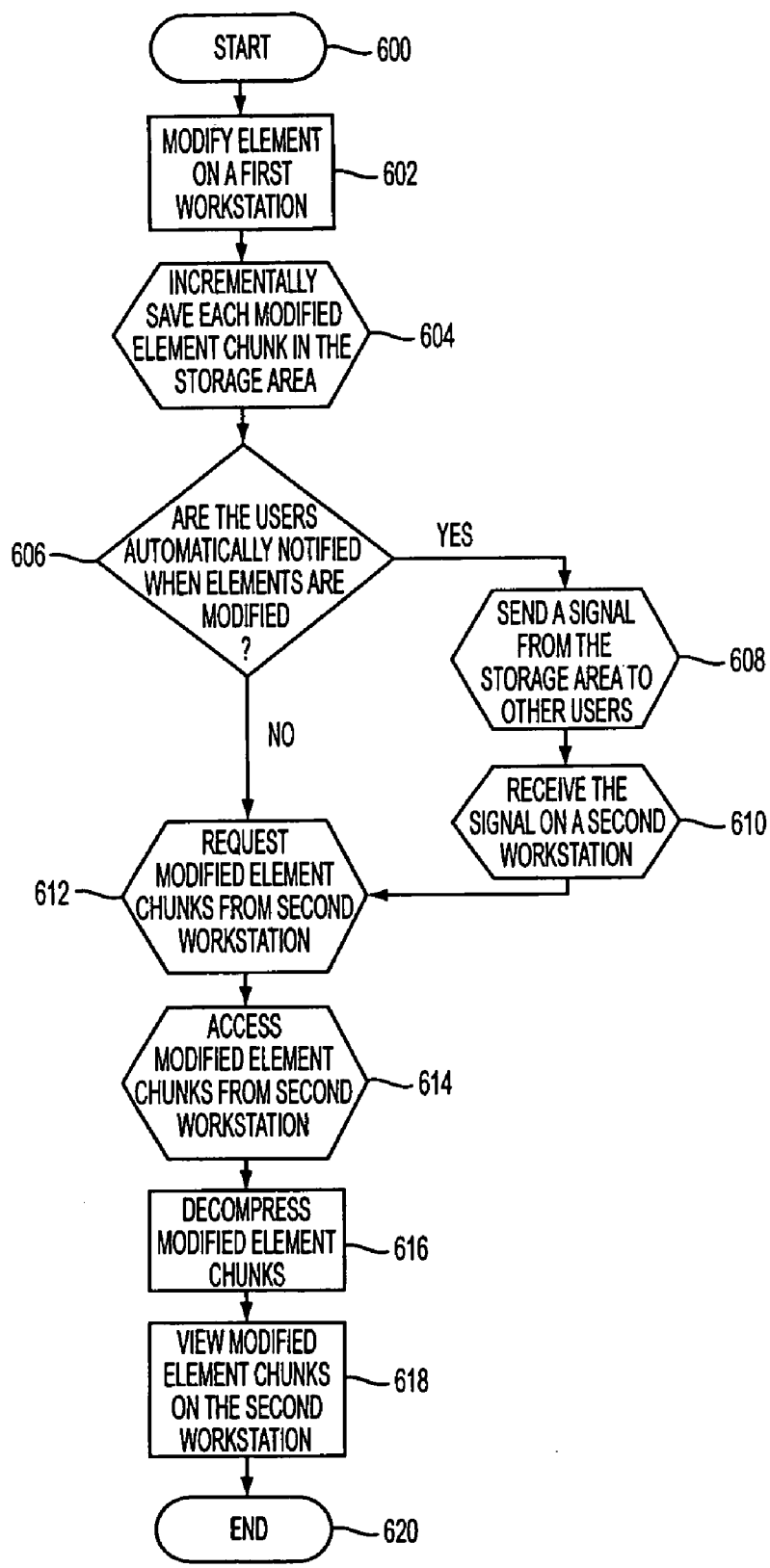
FIGS. 11-11A show block diagram for automatically storing element chunks having modified elements and notifying users of storage of modified elements in a multi-user environment in accordance with other embodiments of the present invention.

FIG. 11A shows a block diagram for automatically storing streams having modified elements in accordance with another embodiment of the present invention. In this embodiment, at least one element in an element chunk 320 is modified on a first workstation 20 (600,602) by a first user, and each modified element chunk 320 is incrementally saved during periods of idle use (604). A second user at a second workstation 20 may have been given permission to view or edit the element chunks 320 containing modified elements. If the second user is on a list of individuals who are notified of updates to files, then a signal may be sent from the computer network 10 to the second workstation 20 to advise the second user that the file has been updated (606, 608, 610). If the second user is not automatically advised of changes by the computer network 10, then the second user must periodically check for updates to the file (606).

Figure 11B:
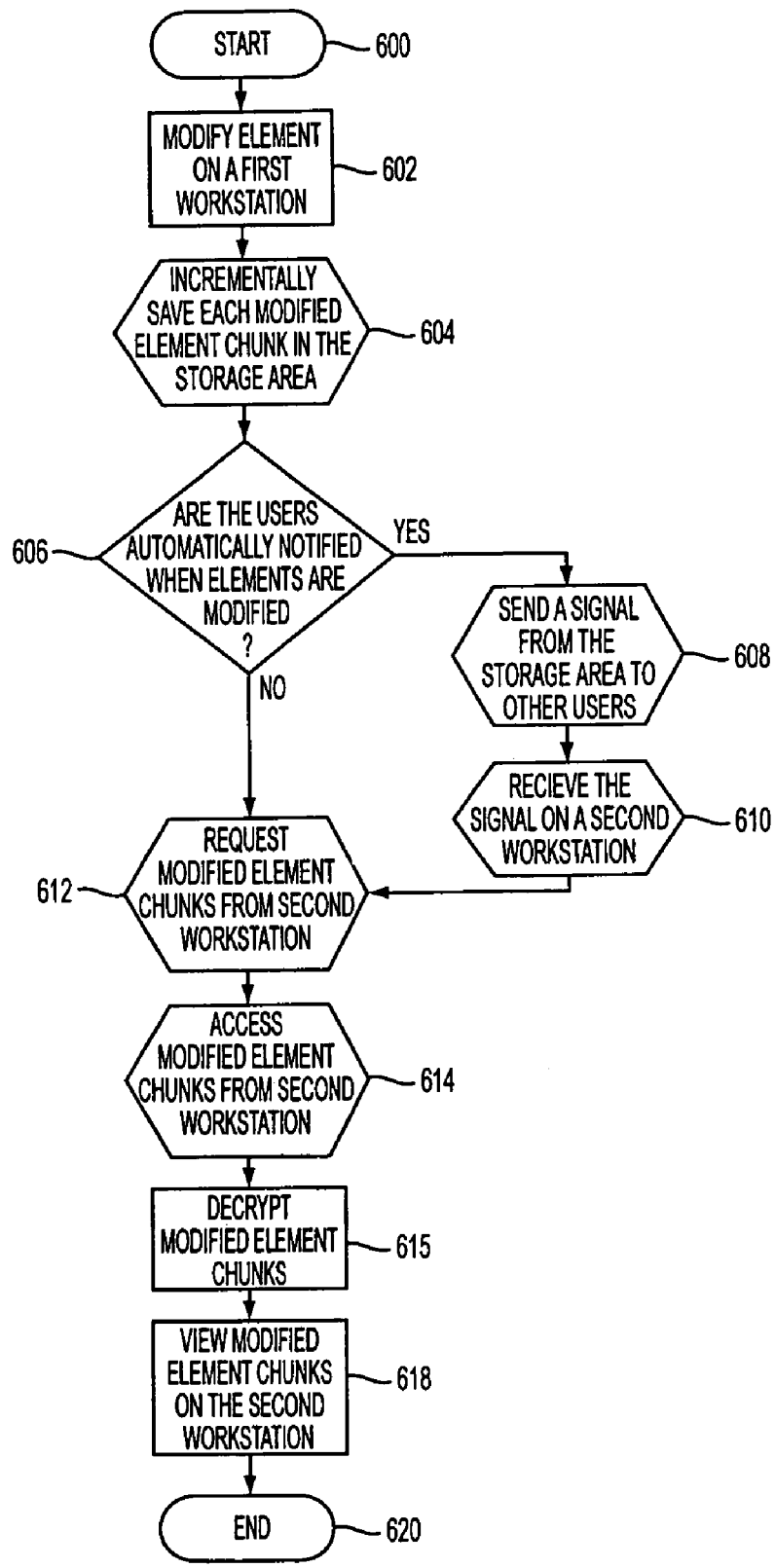

Regardless of how the second user is notified of modifications of elements in element chunks 320 in models 315 of model directories 310 in a file, the second user requests, by way of the second workstation, the modified element chunks 320 (612). The modified element chunks are accessed based on the request from the second workstation (614) and the modified element chunks are decompressed (616) by the second workstation. The modified elements are viewed on the second workstation (618, 620). Alternatively, if the modified element chunks 320 are encrypted instead of compressed, the modified element chunks are decrypted (615) by the second workstation as shown in FIG. 11B, so that they be viewed on the second workstation (618, 620).

Figure 12:
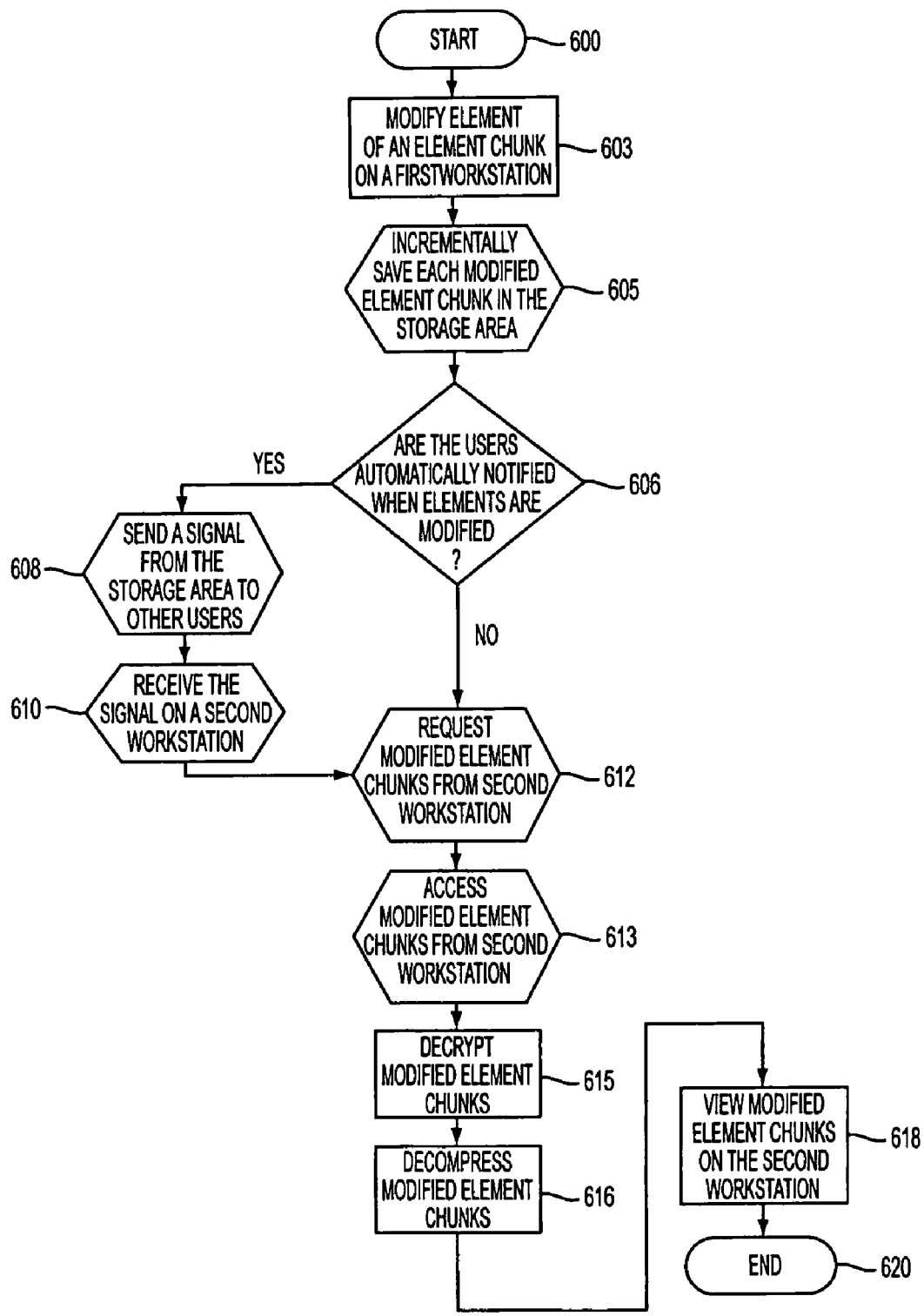
FIG. 12 shows a block diagram for automatically storing element chunks having modified elements and notifying users of storage of modified elements in a multi-user environment in accordance with another embodiment of the present invention.

FIG. 12 shows a block diagram for automatically storing element chunks 320 having modified elements in accordance with another embodiment of the present invention. In this embodiment, at least one element is modified on a first workstation 20 (600, 603) by a first user, and the modified elements are incrementally saved during periods of idle use (605). A second user at a second workstation 20 may have been given permission to view or edit element chunks 320 containing modified elements. If the second user is on a list of individuals who are notified of updates to files, then a signal may be sent from the computer network 10 to the second workstation 20 to advise the second user that the file has been updated (606, 608, 610). If the second user is not automatically advised of changes by the computer network 10, then the second user must periodically check for updates to the file (606).

Regardless of how the second user is notified of modifications to elements in element chunks 320 of element lists 310, the second user requests by way of the second workstation 20 the modified element chunks 320 (612). The modified element chunks 320 are accessed based on the request from the second workstation 20 (613) and the modified element chunks 20 are decrypted (615) and/or decompressed (616) by the second workstation 20. The modified streams are viewed on the second workstation 20 (618, 620).

While the invention has been described in detail with reference to specific and preferred embodiments, it will be appreciated that various modifications and variations will be apparent to the artisan. All such modifications and embodiments as may occur to one skilled in the art are intended to be within the scope of the appended claims.

What I claim as my invention is:

1. A computer readable medium for storing data for access by an application program, comprising:
    a file format defining a structure of a file stored in said computer readable medium, the file format including,
    elements stored in the computer readable medium, the elements being variable sized data records arranged in a format that can be interpreted by a computer program,
    element chunks stored in the computer readable medium, the element chunks being variable sized and including groups of the elements, the element chunks having a unique name and a fixed header including at least one of a number of elements in the element chunk, a compression scheme, or an encryption scheme for the elements, a model stored in the computer readable medium, the model including groups of related element chunks and a model header stream, the model header stream including at least one of a model name, units, or a geometric range for the model, element lists including element chunks classified according to their meaning in the model, the element lists including the unique name for each element chunk in the respective element list, wherein the elements include control elements having no physical representation and graphic elements having a graphical representation, wherein the element lists include a graphic element list listing the graphic elements and a control element list listing the control elements, wherein at least one element chunk in said graphic element list is encrypted and compressed, and a root storage stored in the computer readable medium, the root storage including at least one model.

2. The computer readable medium of claim 1, wherein the element chunks include a fixed number of elements.

3. The computer readable medium of claim 1, further comprising:
   a plurality of models; and
   a model directory stored in the root storage and including a list of the models, the models having a unique name within their respective model directory.

4. The computer readable medium of claim 1, wherein the root storage further includes a file header stream, a session information stream, a manifest information stream, or a file properties stream stored therein.

5. The computer readable medium of claim 1, further comprising a control model directly stored in the root storage and storing information shared across other models in the root storage.

6. The computer readable medium of claim 1, wherein said root storage further comprises a control model storage containing a control model header, a global control element list storage and a global graphic element list storage, wherein said global control element list storage and said global graphic element list storage contain element chunk including global elements.

7. The computer readable medium of claim 6, wherein said global elements contain information relevant for all models in said model directory storage.

8. The computer readable medium of claim 1, wherein at least one element chunk in said graphic element list is compressed.

9. The computer readable medium of claim 1, wherein at least one element chunk in said control element list is compressed.

10. The computer readable medium of claim 1, wherein at least one element chunk in said graphic element list is encrypted.

11. The computer readable medium of claim 1, wherein at least one element chunk in said control element list is encrypted.

12. The computer readable medium of claim 1, wherein at least one element chunk in said control element list is encrypted and compressed.

13. A computer program product comprising a computer readable medium having a computer program logic stored therein, the computer program logic comprising:
   means for enabling said computer system to allocate elements having a variable size to element chunks, the element chunks being variable sized and including groups of the elements, the element chunks having a unique name and a fixed header including at least one of a number of elements in the element chunk, a compression scheme, or an encryption scheme for the elements;
   means for enabling said computing unit to store in the computer readable medium at least one model, wherein said at least one model is for grouping related elements, is identifiable by a unique identifier, and comprises a control element list having variable sized element chunks containing control elements, and a graphic element list having variable sized element chunks containing graphic elements;
   means for compressing each element chunk stream to be stored in said graphic element list storage or said control model list storage in said control model directory,
   means for enabling said computer system to store a graphic element list storage and a control element list storage in each control model; and
   means for enabling a computing unit to store a root storage comprising the model in the computer readable medium.

14. A CAD design file having a file format and stored on a computer readable medium, the CAD design file comprising:
   elements representing items of the CAD design, the elements being variable sized data records arranged in a format that can be interpreted by a computer program,
   element chunks including groups of the elements, the element chunks having a unique name and a fixed header including at least one of a number of elements in the element chunk, a compression scheme, or an encryption scheme for the elements, the element chunks having a variable size, the groups of elements including control elements having no physical representation and graphic elements having a graphical representation,
   a model, the model including groups of related element chunks and a model header stream, the model header stream including at least one of a model name, units, or a geometric range for the model,
   element lists including element chunks classified according to their meaning in the model, the element lists including the unique name for each element chunk in the respective element list, wherein the elements include control elements having no physical representation and graphic elements having a graphical representation, wherein the element lists include a graphic element list listing the graphic elements and a control element list listing the control elements, wherein at least one element chunk in said graphic element list is encrypted and compressed, and
   a root storage including at least one model and a control model storing information shared across other models in the root storage.

15. The computer readable medium of claim 14, wherein the element chunks include a fixed number of elements.

16. The computer readable medium of claim 14, further comprising:
   a plurality of models; and
   a model directory stored in the root storage and including a list of the models, the models having a unique name within their respective model directory.

17. The computer readable medium of claim 14, wherein the root storage further includes a file header stream, a session information stream, a manifest information stream, or a file properties stream stored therein.

18. The computer readable medium of claim 14, further comprising a control model directly stored in the root storage and storing information shared across other models in the root storage.

19. The computer readable medium of claim 14, wherein said root storage further comprises a control model storage containing a control model header, a global control element list storage and a global graphic element list storage, wherein said global control element list storage and said global graphic element list storage contain element chunk including global elements.

20. The computer readable medium of claim 19, wherein said global elements contain information relevant for all models in said model directory storage.

21. The computer readable medium of claim 14, wherein at least one element chunk in said graphic element list is compressed.

22. The computer readable medium of claim 14, wherein at least one element chunk in said control element list is compressed.

23. The computer readable medium of claim 14, wherein at least one element chunk in said graphic element list is encrypted.

24. The computer readable medium of claim 14, wherein at least one element chunk in said control element list is encrypted.

25. The computer readable medium of claim 14, wherein at least one element chunk in said control element list is encrypted and compressed.

* * * * *